June 21, 1960 E. C. DENCH 2,942,142
TRAVELING WAVE OSCILLATOR TUBES
Filed Aug. 30, 1957 3 Sheets-Sheet 1

INVENTOR
EDWARD C. DENCH
By Elmer J. Gorn
ATTORNEY

June 21, 1960 E. C. DENCH 2,942,142
TRAVELING WAVE OSCILLATOR TUBES
Filed Aug. 30, 1957 3 Sheets-Sheet 2
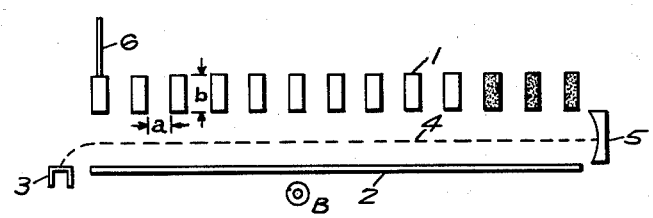
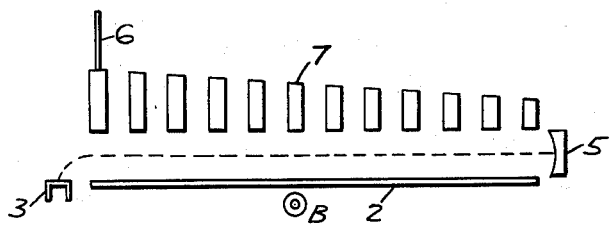
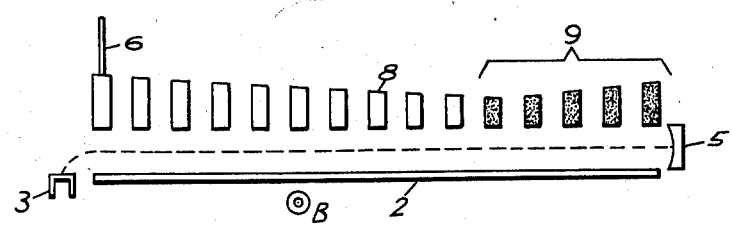
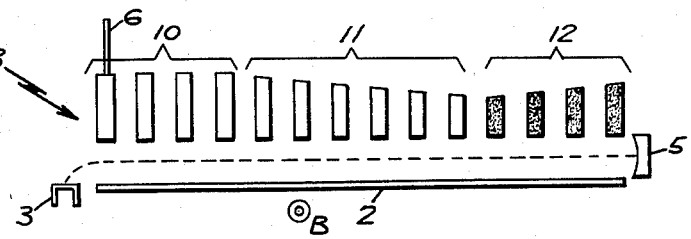
INVENTOR
EDWARD C. DENCH
BY Elmer J. Gorn
ATTORNEY June 21, 1960 E. C. DENCH 2,942,142
TRAVELING WAVE OSCILLATOR TUBES
Filed Aug. 30, 1957 3 Sheets-Sheet 3

INVENTOR
EDWARD C. DENCH
BY Elmer J. Gorn
ATTORNEY

United States Patent Office 2,942,142
Patented June 21, 1960

2,942,142

TRAVELING WAVE OSCILLATOR TUBES

Edward C. Dench, Needham, Mass., assignor to Raytheon Company, a corporation of Delaware Filed Aug. 30, 1957, Ser. No. 681,356

6 Claims. (Cl. 315—3.5)

This invention relates generally to high frequency oscillating devices which utilize the prolonged interaction between a stream of charged particles forming an electron beam and a traveling electromagnetic wave guided by a retardation or delay line. Devices of this type are generally designated traveling wave tubes. More particularly the invention pertains to backward wave oscillators constructed in a manner which greatly improves the efficiency of oscillation.

Figure 1:
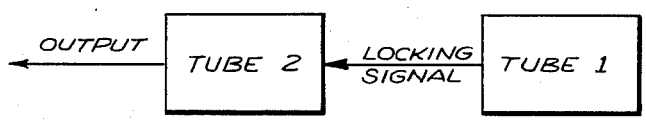
Figure 2:
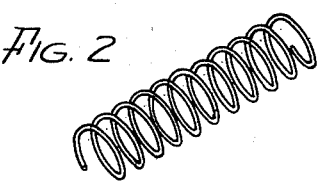
Figure 3:
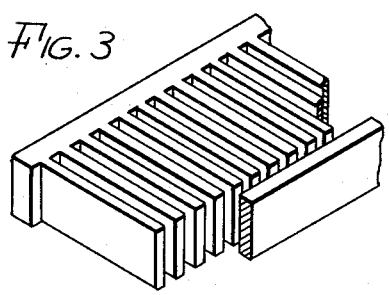
Figure 4:
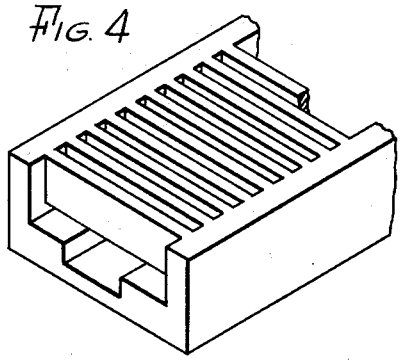
Figure 5:
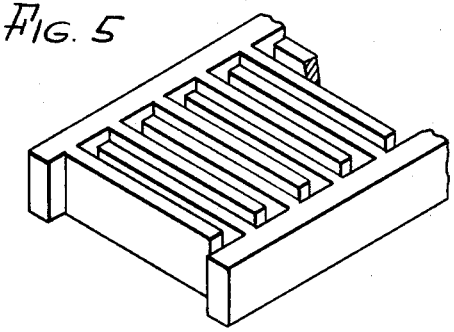
Figure 10:
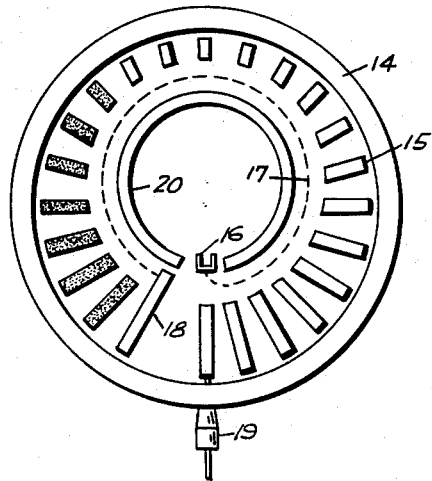
Figure 11:
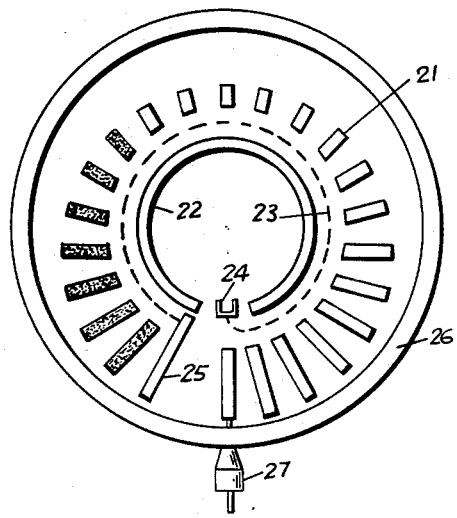

In a backward wave oscillator the electron beam travels at a velocity associated with the phase velocity of a traveling wave space component moving in a direction opposite to that of the energy flow along a wave propagating structure. The wave propagating structure is a delay line of the periodic filter type having suitable wave retardation properties. The invention resides in the employment in a backward wave oscillator of a delay line constructed in such manner that the impedance of the delay line is characterized by a progressive and gradual change in value intermediately of the ends of the line. The concept underlying this construction and the advantages obtained from the invention will become apparent by reference to the following exposition considered in connection with the drawings in which:

Fig. 1 is a schematic showing of a system for increasing the power output of a backward wave oscillator;

Figs. 2, 3, 4, and 5 illustrate various types of delay lines used in backward wave oscillators;

Fig. 6 is a schematic representation of the conventional internal structure of a backward wave oscillator;

Figs. 7, 8, and 9 are schematic representations of several species of the invention embodied as rectilinear backward wave oscillators; and Figs. 10 and 11 are schematic representations of the invention embodied in a circular backward wave oscillator tube.

While investigating the performance of backward wave oscillators in the region of 3000 mc. and above, experiments have shown that injection of an R.F. signal at the attenuation end of a backward wave oscillator tube greatly improves the efficiency of oscillation where the frequency of the driver R.F. signal is at or close to the free-running frequency of the oscillator tube. For example, a tube normally producing a power of 138 watts at 12.8% efficiency has produced a power of 390 watts at 36.3% efficiency when a signal of 37 watts was injected at the attenuation end. In another case, an overall efficiency of 45% was obtained for a power output of 346 watts and a locking power of 38 watts, in a tube structure which, when used in the conventional manner (without injection of a locking R.F. signal), yielded an average efficiency of 25%. These results led to the development of high frequency electrical generation systems which are disclosed in the copending application of Edward C. Dench et al., Serial No. 562,472, filed January 31, 1956, now Patent No. 2,888,649. That application discloses that two or more backward wave oscillator tubes, properly designed for power level, may be connected in tandem in such manner that the overall efficiency of the system is appreciably higher than the efficiency of those tubes when operated independently. For example, Fig. 1, schematically indicates a system of the genre contemplated in the copending application. Tube 1 represents a backward wave oscillator designed to utilize 160 watts of input power and to supply 40 watts output, the tube therefore being 25% efficient. The output of tube 1 provides the locking signal for tube 2 and is injected at the attenuator end of the latter. Tube 2 is designed to operate with one kilowatt of input power and to provide an output of 400 watts when locked. The overall efficiency of the system therefore is:

$$\text{eff.} = \frac{\text{output}}{\text{Total input}} = \frac{400}{1160} = 34.5\%$$

Those experimental results initially led to the thought that a backward wave oscillator tube having high power output and good efficiency might be realized by employing in the tube a delay line having two sections, the function of the first section being to provide a locking signal of adequate power level to the second section which would provide the output power. It was evident, however, that a sharp discontinuity between the two sections of the delay line would defeat realization of the desired result because of severe reflection of the wave propagating in the delay line. I then conceived the idea of employing a delay line having a progressively tapering impedance through a substantial portion of its length so that in effect the tapered impedance part of the delay line may be considered as constituted by a number of small sections of different characteristic impedance, each section providing a signal driving the adjacent section of lower characteristic impedance.

The invention may be embodied in a multiplicity of forms since delay lines of various kinds are known in the traveling wave tube art. Among the better known types of delay lines are the helix, comb, ladder, and interdigital line shown in Figs. 2 to 5, respectively. The invention is embodied, by way of example, in an interdigital type of delay line and the application of the invention to other types can by analogy, be readily discerned.

Referring now to Fig. 6 which schematically depicts the internal elements of a backward wave oscillator tube, there is shown a conventional interdigital delay line 1, an elongated electrode 2 known as the "sole" spaced from the delay line, an electron gun 3 which projects an electron beam 4 into the interaction space bounded by the delay line and the sole, and a collector electrode 5 for collecting those electrons which transit the length of the interaction space. The output of the oscillator tube is obtained from an output coupling 6 connected to the delay line 1 adjacent the gun end of the tube. The terminal digits of the delay line at the collector end are stippled to indicate that attenuation has been provided in the line. The purpose of that attenuation is to absorb wave energy to prevent reflection of waves from the collector end of the line. The attenuation may, for example, take the form of an iron coating adhering to the terminal digits or a lossy material inserted between the digits. In the interaction space an electric field is established by applying a D.C. potential between the delay line and the sole. A constant magnetic field is established in the interaction space normal to the electric field and in such direction that the electrons of the beam are impelled by the crossed fields toward the collector 5. The characteristic impedance of the interdigital delay line 1 is a function of the distance $a$ between adjacent digits and the height $b$ of the digits. When the height $b$ is larger than $a$, the following approximate relationship applies:

$$Z_0 \propto \frac{a}{b}$$

It is known that in such a backward wave oscillator the R.F. field along the line is most intense at the end nearest the gun 3, least intense at the remote end, and in between these ends the R.F. field intensity decreases gradually as said remote end is approached, reaching a minimum substantially at the approach of the attenuation region. The electron beam 4 interacts most strongly where the R.F. field is most intense and because of the R.F. field intensity distribution, the major interaction occurs at the end nearest the gun 3. It can be appreciated that an improvement in interaction between the beam 4 and the field at the remote end causes an intensification of the R.F. field along the entire delay line and hence has an amplified effect upon the power output of the oscillator. In order to promote the efficiency of the oscillator, the invention contemplates intensifying the R.F. field adjacent the remote end so that the electron beam may better interact with the field.

Fig. 7 schematically illustrates a backward wave oscillator embodying the invention. It will be noted that delay line 7 is constituted by digits which taper in height from a maximum at the gun end to a minimum at the remote end. The purpose of that taper is to cause the characteristic impedance of line 8 to gradually increase in value from the gun end toward the remote end. The proportionality $$Z_0 \propto \frac{a}{b}$$

indicates that the characteristic impedance of such a delay line can be increased by decreasing the height $b$ of the digits. The characteristic impedance of the delay line may also be increased by increasing the distance $a$ between digits but other considerations, principally the appreciable change in phase velocity of the electromagnetic energy propagating along the delay line which accompanies a non-uniform spacing between the digits, makes it a less desirable method of varying the impedance of the delay line. A variation in the height $b$ of the digits will inevitably have some effect upon the phase velocity of wave energy traveling along the delay line but that effect will be negligible. As a result of gradually increasing the characteristic impedance of line 7 in the manner indicated, the R.F. field adjacent the remote end is caused to be intensified and better interaction between the beam 4 and the R.F. field adjacent the remote end of the line is achieved. As previously stated the electron beam interacts most strongly with the R.F. field at the gun end of the delay line and therefore the digits in this region must be capable of dissipating the heat caused by electrons which yield their energy to the R.F. field and strike the digits of the delay line. The digits of the line nearest gun end must, therefore, be sufficiently large to effectively dissipate that heat to prevent burning or melting of the digits. A delay line constructed in accordance with the invention is inherently well-suited to the requirements of heat dissipation since the region of most intense R.F. field will have the largest digits, and in the regions where the R.F. field is less intense the digits are of smaller physical size. Because better interaction between the R.F. field adjacent the remote end and the electron beam is achieved, the wave energy propagating on the line toward the output is enhanced and constitutes a driving signal for the portion of the line which is of lower characteristic impedance Fig. 8 schematically illustrates an interdigital delay line which is an improvement on the delay line previously described. The delay line 8 is terminated at the remote end by digits 9 which gradually increase in height and are coated with an electromagnetic energy attenuating material, such as iron. Where it is anticipated that substantial amounts of power will be reflected from the output 6 toward the remote end of the delay line, and hence that a large amount of heat will be generated in the attenuating material, the terminal digits must be of ample size to dissipate that heat. Since the delay line is tapered so that the digits progressively decrease in height, the smallest digits would normally be at the attenuation end of the delay line. Small digits are unsuited to dissipating large amounts of heat. The improvement therefore resides in gradually increasing the height of the terminal digits to provide those digits with larger heat dissipating areas.

Fig. 9 illustrates a further modification of the invention having improved power-handling capabilities. The delay line 13 of Fig. 9 may be viewed as constituted by three sections. The first section 10, nearest the gun, comprises digits of uniform size; the intermediate section 11 comprises digits which progressively diminish in height as the distance from the gun end of the line increases; and the third section 12 comprises digits which progressively increase in height as the distance to the remote end diminishes. The digits of the third section have associated with them a means, such as a coating of iron, which constitutes an attenuation and prevents reflection of wave energy. The largest digits are located nearest the gun end where the interaction between the electron beam and the R.F. field is most pronounced and where the heat generated by the electrons striking the delay line is most intense. Because of their size the digits of the first section 10 are capable of dissipating that heat effectively. In the intermediate section the interaction of the beam with the R.F. field is less pronounced and the heat dissipating requirement is less stringent; however, the taper of the section distributes the R.F. field so that better interaction is achieved and the wave energy induced by that interaction propagates toward the output 6 and is a driving signal for the first section. In the vicinity of the third section 12 the R.F. field is relatively weak and there is little interaction with the electron beam. However, a large quantity of heat may be generated in the attenuation by wave energy reflected from the output 6 toward the remote end of the line so that the heat dissipating requirement at the remote end may be severe. By gradually increasing the height of the digits toward the remote end, the heat is distributed among digits of larger bulk and hence more effective dissipation is attained. In lieu of providing digits of increasing height at the remote end of the line, the terminal digits may be uniform size and the line may be lengthened to distribute the heat over a larger number of terminal digits. The disadvantages of this alternative reside in the difficulties attendant in any traveling wave tube of considerable length, the principal disadvantage being that the delay line must be considerably lengthened so that an unwieldy structure results.

It should be understood that the delay lines shown herein are exemplars of the invention and that the specific tapers of the line which are illustrated need not be employed. The taper of the interdigital delay line may be linear, may follow an exponential curve, or may be any configuration of the delay line which causes the characteristic impedance of the line to gradually increase from the gun end toward the remote end.

The invention has thus far been described in connection with rectilinear tubes. Fig. 10 illustrates the invention embodied in a backward wave oscillator tube of the circular type. In that figure an annular casing 14 is shown surrounding an arcuate delay line 15 of the interdigital type. An electron gun 16 provides an electron beam 17 which traverses the interaction space and is absorbed by a collector electrode 18. The collector may be simply an extension of delay line 15 or it may be an independent structure maintained at an electric potential close to that of the delay line. The output from the tube is obtained adjacent the gun end of the delay line through output coupling 19. The circular type of backward wave oscillator utilizing a delay line constituted by periodically spaced digits is particularly suited to utilization of the invention. The digits of the delay line are arranged so that the internal edges of the digits lie along a circle whose center is offset from the center of the circle formed by casing 14, while the outer edges of the digits lie along a circle which is concentric with the casing whereby the delay line is caused to have a gradually tapered characteristic impedance. A sole electrode 20, having a circular configuration, is positioned in the tube concentric with the circle defined by the inner edges of the digits. The electron gun 16 is positioned adjacent the largest of the digits. At the collector end of the line where the digits gradually increase in height, an attenuating means is inserted in the line to absorb energy which may be reflected toward that end of the line. In essence the circular backward wave oscillator tube is merely a rectilinear tube which has been bent into a circle and any of the impedance tapers previously discussed may be used in the circular delay line.

Fig. 11 illustrates an alternative construction of a circular type backward wave oscillator tube incorporating the invention. A delay line 21, which is preferably of the interdigital type, is fabricated so that the outer edges of the digits lie along a circle which is eccentric with respect to the circle circumscribed by the inner edges of the digits. A circular sole electrode 22 is concentric with and of smaller diameter than the cirle circumscribed by the digits' inner edges and bounds therewith an interaction space into which is injected an electron beam 23 emanating from an electron gun 24 positioned near one end of the delay line. A collector electrode 25, preferably terminating the other end of the delay line, absorbs those electrons which completely transit the interaction space. In the interaction space an electric field is established by applying a D.C. potential between the delay line and the sole. A constant magnetic field is established in the interaction space normal to the electric field and in such direction that the electrons of the beam are impelled by the crossed fields toward the collector 25. At the collector end of the line the digits are stippled to indicate that an attenuation has been inserted in the line to make that end of the line substantially reflectionless. The output from the tube is obtained adjacent the gun end of the delay line through an output coupling 27 which is electrically connected to a terminal portion of that line. The internal elements of the tube are surrounded by a circular casing 26 which is concentric with the sole 22. It will be observed from Fig. 11 that casing 26, sole 22, and the inner edges of the digits of the delay line form a set of concentric circles while the outer edges of the delay line digits form an eccentric circle. This construction causes the radial distance between the inner wall of casing 26 and the periphery of the delay line 21 to vary inversely with the height of the digits. An inspection of Fig. 10, by way of comparison, will show that the radial distance between the inner wall of casing 14 and the periphery of delay line 15 does not vary with the height of the digits but is uniform about the entire circumference.

The invention makes possible a substantial increase in the power output obtainable from a backward wave oscillator tube through an improvement in its efficiency. A further increase in output power from a tube embodying the invention may be obtained by utilizing the scheme shown in Fig. 1. That is tube 1, which may be a magnetron, a klystron, a conventional backward wave oscillator, a backward wave oscillator tube having a tapered impedance line, or any oscillatory microwave signal source having an appreciable power output, is connected in tandem to tube 2 and furnishes a driving signal of adequate power level to the second tube which is a backward wave oscillator embodying the invention. It will be found that by this scheme a substantial increase in the power output of the second tube will be obtained.

The invention is not limited to the particular details of construction illustrated herein, as equivalents will suggest themselves to those skilled in the art. It is, accordingly, desired that the appended claims be given a broad interpretation commensurate with the scope of the invention.

What is claimed is:

1. In a microwave oscillator of the type utilizing interaction between an electron beam and an electromagnetic wave propagating along a retardation line in the direction opposite to the direction of flow of said electron beam, said oscillator including an electron source and having an output coupling means disposed adjacent said source, the improvement comprising a retardation line having a periodic structure positioned adjacent the path traversed by said electron beam, said retardation line having its characteristic impedance gradually increased in value over a major portion of said line in the direction of flow of said electron beam from a relatively low value in the vicinity of said source to a relatively high value at a region along said line substantially removed from said source.

2. In a microwave oscillator of the type utilizing interaction between an electron beam and an electromagnetic wave propagating along a retardation line in the direction opposite to the flow of said electron beam, said oscillator including an electron source and having an output coupling means disposed adjacent said source, the improvement comprising a retardation line having periodically spaced digits, at least some of the intermediate digits of said line being proportioned to cause the characteristic impedance of said line to gradually increase in value over a major portion of said line in the direction of flow of said electron beam from a relatively low value in the vicinity of said source to a relatively high value at a region along said line substantially removed from said source.

3. In a microwave oscillator of the type utilizing interaction between an electron beam and an electromagnetic wave propagating along a retardation line in the direction opposite to the flow of said electron beam, the improvement comprising a retardation line having periodically spaced digits arranged along the path traversed by said electron beam, at least some of the intermediate digits over a major portion of said line being gradually lesser in height in the direction of beam travel whereby the characteristic impedance of said line is increased in the direction of beam travel.

4. A microwave oscillator comprising means for producing an electron beam, an electron beam collector spaced from said means and defining therebetween a path of electron flow, a delay line having a periodic structure positioned along said path, attenuation means disposed at the end of said line remote from said beam-producing means to prevent reflections of wave energy, said delay line having a gradually varying characteristic impedance tapering in value in the vicinity of said beam-producing means intermediate its ends from a lower value to a higher value along a region of said line adjacent said attenuation means, and output coupling means at the end of said delay line adjacent said beam producing means for extracting wave energy from said microwave oscillator.

5. A microwave oscillator comprising an electron source and a collector electrode defining therebetween a path of electron flow, a delay line having periodically spaced digits positioned along said path in which there is induced by the electron flow an electromagnetic wave which travels in a direction opposite to the direction of electron flow, said delay line having its spaced digits gradually varied in height to cause the characteristic impedance of said line to taper in value intermediate its ends from a lower value to a higher value in the direction of beam travel, the end of said line remote from said electron source being terminated by digits of increased size, and attenuation means inserted in said line at said remote end for absorbing wave energy.

6. A microwave oscillator comprising an electron source and a collector electrode defining therebetween a path of electron flow, a delay line having periodically spaced digits positioned along said path in which there is induced an electromagnetic wave which travels in a direction opposite to the direction of electron flow, said delay line being constituted by first, second, and third sections, said first section being disposed adjacent said electron source and having a characteristic impedance of low value, said second section being a continuation of said first section and having digits proportioned to cause the characteristic impedance of said second section to taper from said low value to a higher value in the direction of electron flow, said third section being a continuation of said second section and having terminal digits of progressively increased size, and attenuation means disposed in the third section of said delay line.

References Cited in the file of this patent

UNITED STATES PATENTS

| | | |
|---|---|---|
| 2,531,972 | Doehler et al. | Nov. 28, 1950 |
| 2,637,775 | Lund | May 5, 1953 |
| 2,641,731 | Lines | June 9, 1953 |
| 2,687,777 | Warnecke et al. | Aug. 31, 1954 |
| 2,708,236 | Pierce | May 10, 1955 |
| 2,730,648 | Lerbs | Jan. 10, 1956 |
| 2,760,102 | Field | Aug. 21, 1956 |
| 2,807,744 | Lerbs | Sept. 24, 1957 |
| 2,880,355 | Epsztein | Mar. 31, 1959 |

FOREIGN PATENTS

| | | |
|---|---|---|
| 740,998 | Great Britain | Nov. 23, 1955 |
| 841,311 | Germany | June 13, 1952 |
| 944,863 | Germany | July 19, 1956 |
| 969,886 | France | May 31, 1950 |
| 1,071,983 | France | Mar. 10, 1954 |

UNITED STATES PATENT OFFICE
CERTIFICATION OF CORRECTION

Patent No. 2,942,142                      June 21, 1960

Edward C. Dench

It is hereby certified that error appears in the above numbered patent requiring correction and that the said Letters Patent should read as corrected below.

Column 3, line 53, after "nearest" insert -- the --; column 5, line 25, for "cirle" read -- circle --; column 6, line 10, for "having" read -- have --; lines 53 and 54, strike out "intermediate its ends from a lower value" and insert the same after "value" in line 52, same column; line 56, for "beam" read -- beam- --.

Signed and sealed this 18th day of July 1961.

(SEAL)
Attest:

ERNEST W. SWIDER                             DAVID L. LADD
Attesting Officer                               Commissioner of Patents